April 24, 1951

E. GODAT 2,550,191

AUTOMATIC CUTTING DEVICE

Filed March 12, 1947

INVENTOR
EDMOND GODAT
BY Henry P. Truesdell
ATTORNEY

April 24, 1951

E. GODAT 2,550,191

AUTOMATIC CUTTING DEVICE

Filed March 12, 1947

INVENTOR
EDMOND GODAT
BY Henry P. Truesdell
ATTORNEY

April 24, 1951

E. GODAT 2,550,191

AUTOMATIC CUTTING DEVICE

Filed March 12, 1947

INVENTOR
EDMOND GODAT
BY Henry P. Truesdell
ATTORNEY

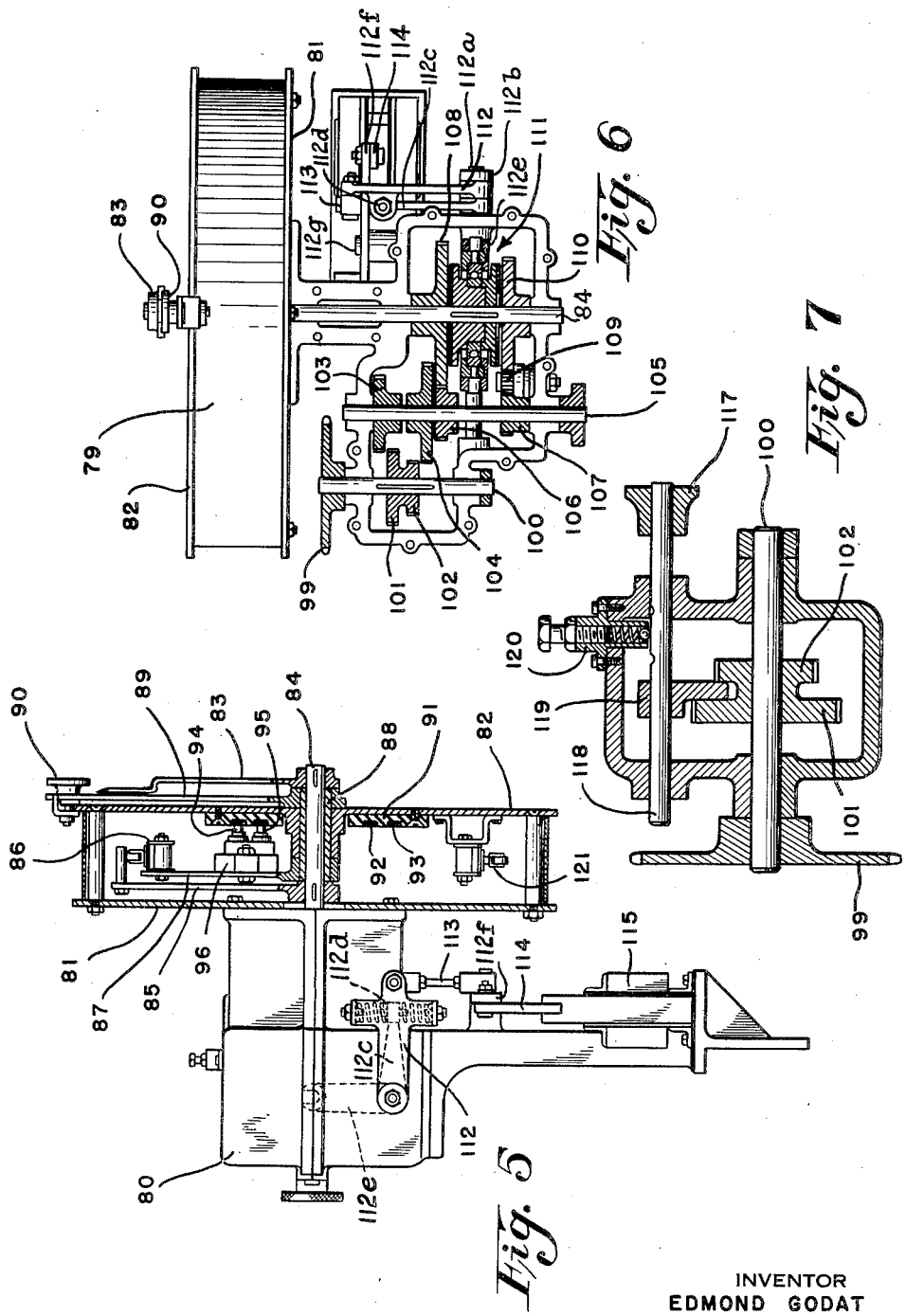

April 24, 1951  E. GODAT  2,550,191
AUTOMATIC CUTTING DEVICE
Filed March 12, 1947  6 Sheets-Sheet 6

INVENTOR.
EDMOND GODAT
BY Henry P. Truesdell
ATTORNEY

Patented Apr. 24, 1951

2,550,191

UNITED STATES PATENT OFFICE 2,550,191

AUTOMATIC CUTTING DEVICE

Edmond Godat, Los Angeles, Calif., assignor to United States Rubber Company, New York, N. Y., a corporation of New Jersey Application March 12, 1947, Serial No. 734,051

27 Claims. (Cl. 164—76)

This invention relates to an automatic cutting device and in particular it relates to a device for measuring and cutting a length of strip stock. More particularly, the invention relates to an apparatus for measuring and skiving a slab of tread stock used in the manufacture of pneumatic tires.

In the manufacture of pneumatic tires, it is customary to extrude in a continuous length a strip of tread stock formed of a rubber or synthetic rubber composition. This stock is cut to proper length by a skiving operation which produces a cut at a diagonal, relative to the thickness of the tread stock for the purpose of splicing and knitting the ends of the tread together to form an annular band.

In order to obtain proper tire balance and to otherwise maintain pneumatic tires within definite specifications, it is essential that the length of the tread slab be cut to a definite and accurate length. It is also desirable to so design the apparatus that it effects the tread cutting while the tread stock is moving continuously on a conveyor.

In general, the invention comprises a conveyor for moving a strip of tread stock in a continuous path, a carriage capable of movement with the conveyor for a predetermined distance, means for actuating movement of the carriage, means for positioning a motor operated knife in relative association with the tread slab, means to traverse the knife to sever the material, and measuring means for measuring the tread slab in an accurate predetermined length.

Among the objects of my invention are to provide an automatic tread-cutting device capable of accurately and efficiently severing a length of tread slab while the tread moves continuously with a conveyor; to provide a tread cutting device which likewise moves along with the moving tread in a constant position relative thereto during a cutting cycle; to provide a cutting device which may be easily and accurately adjusted by means of an indicator arm operating in combination with a calibrated dial, and to provide an automatic tread cutting device of the character described which, as manufactured, is efficient and economical. These and other objects and advantages will appear more fully in the following detailed description when considered in connection with the accompanying drawings in which:

Figure 5 is a detailed view of a measuring device partly in section taken along lines V—V of Figure 2;

Figure 6 is a plan view of the measuring device as shown in Figure 5 illustrating a portion of the interior of the device in section;

Figure 7 is a detailed view in section taken along lines VII—VII of Figure 1 illustrating a change gear mechanism;

Figure 9 is a view in section of a motor operated cutter disk taken along lines IX—IX of Figure 2.

Figure 1:
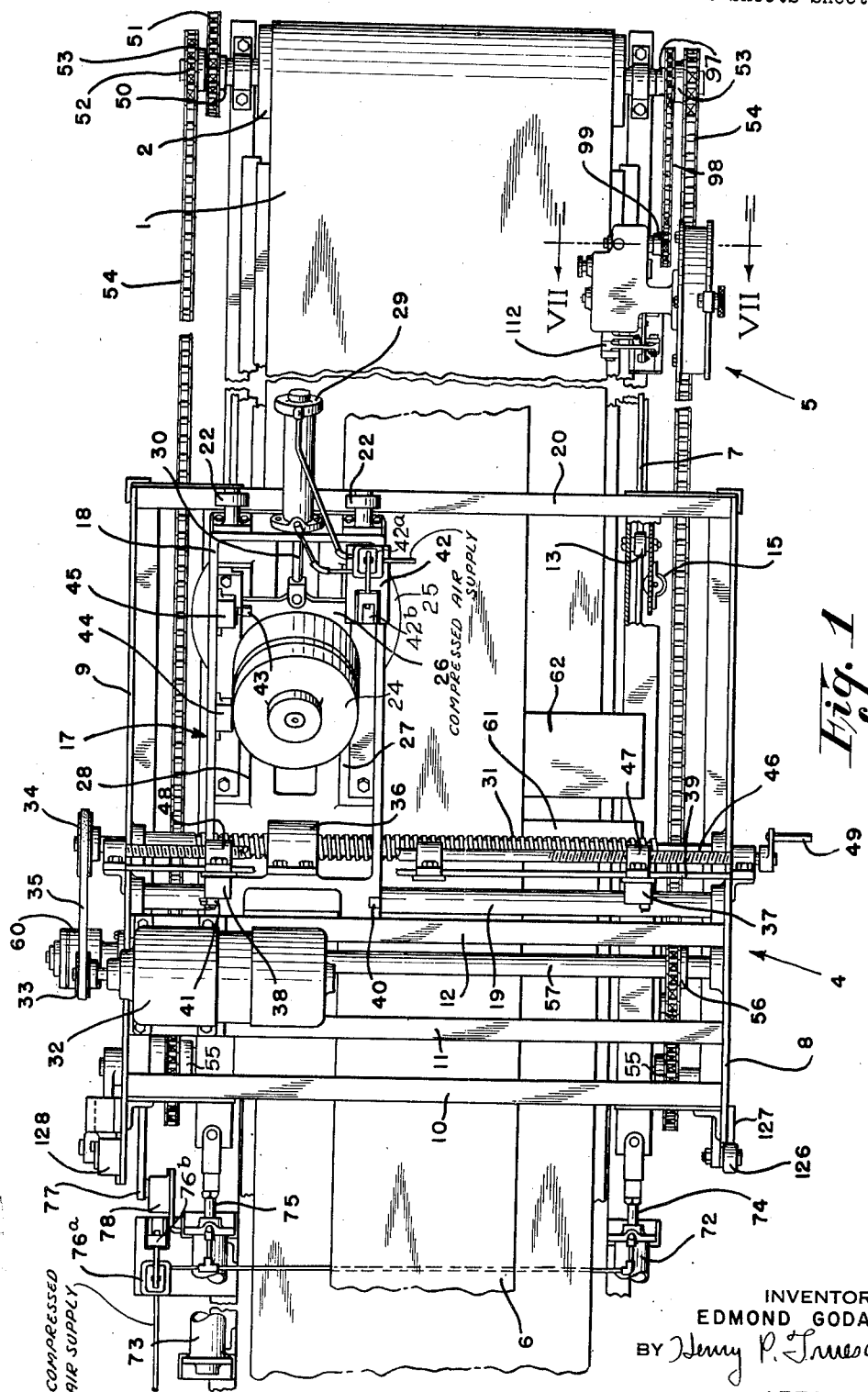
Figure 1 is a plan view of an apparatus forming an embodiment of my invention.
Figure 2:
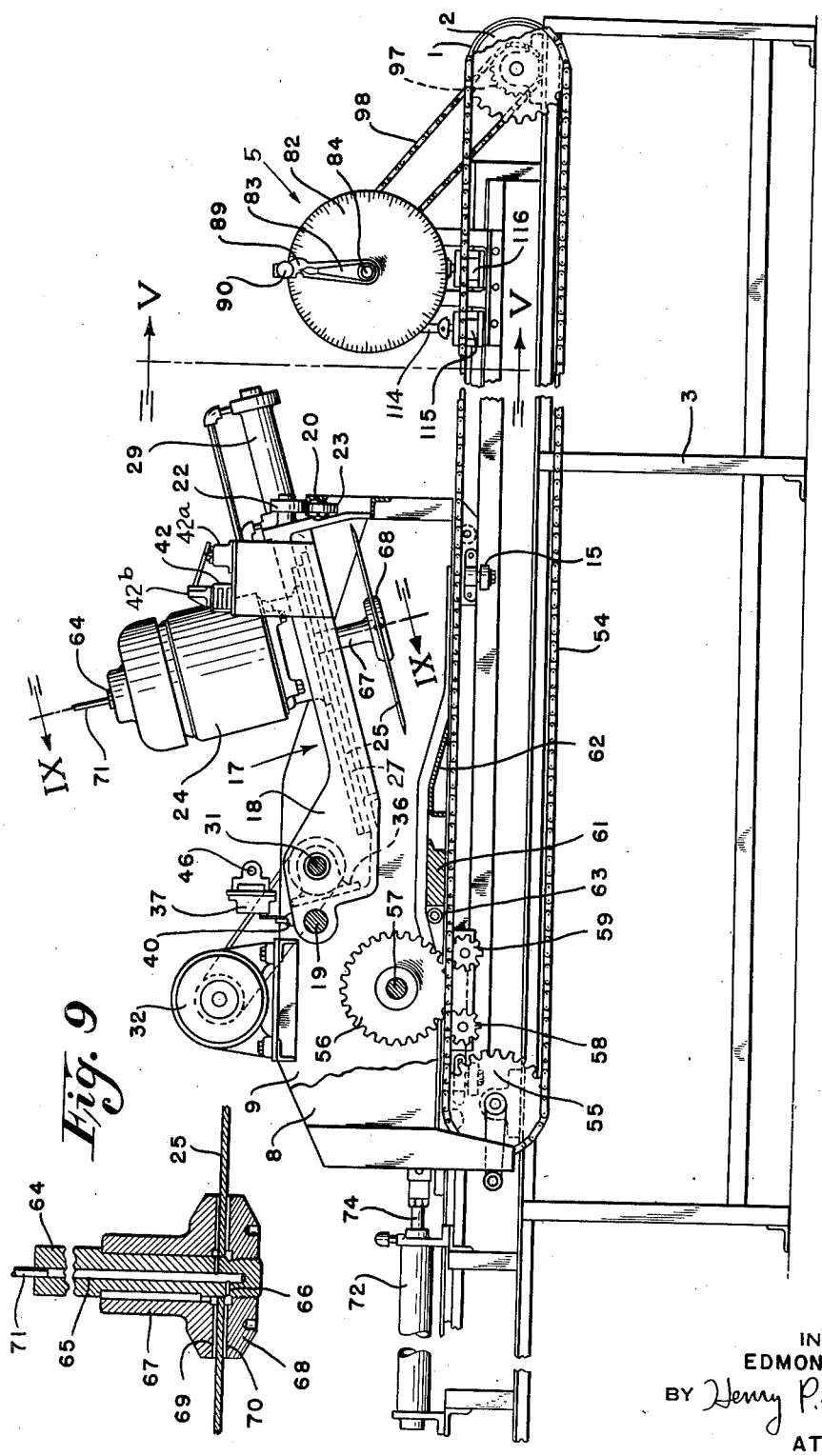
Figure 2 is a side elevational view thereof, partly broken away and partly in section.

With reference to the drawings and in particular to Figures 1 and 2, I show an embodiment of my invention in the form of an automatic tread cutting device comprising essentially a belt type conveyor 1 operating over a roller 2 and supported by the structural frame work 3 in combination with a carriage 4 and a measuring device 5 positioned in functional relationship with the conveyor. The conveyor operates continuously and is adapted to carry a continuous length of tread stock 6. While I show and describe a strip of tread stock 6, it is to be understood that the apparatus herein described is applicable for measuring and cutting to proper length various other strip stock materials.

Figure 4:
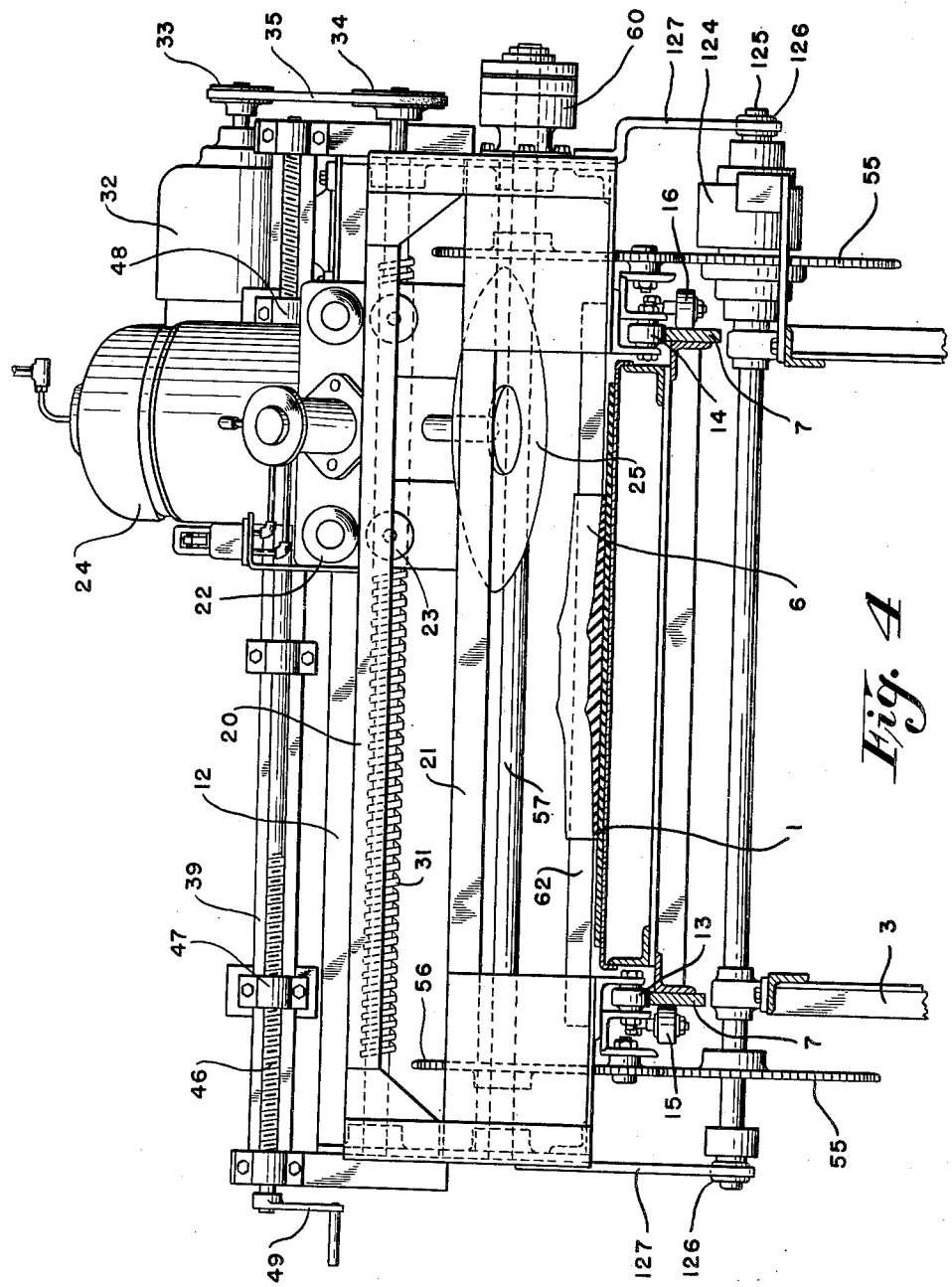
Figure 4 is a transverse view in section taken along lines IV—IV of Figure 3.

Positioned on each side of the conveyor is a rail 7 adapted to support the carriage 4. Essentially, the frame of the carriage comprises side plates 8 and 9 retained in spaced relationship by structural cross members 10, 11, 12 and angle 20. There are two sets of wheels 13, 14 and 15, 16 at opposite ends of the carriage although only one set is shown. The carriage 4 is supported by wheels 13 and 14 and side thrust wheels 15 and 16 (Figure 4).

Associated with the carriage 4 is a secondary carriage 17 which is movable transversely of the carriage 4. The secondary carriage 17 comprises a frame 18 slidably supported on a shaft 19 retained between side plates 8 and 9. The carriage 17 is additionally supported on the structural angle 20 also attached to the side plates 8 and 9. Rollers 22 and 23 are attached to the frame 18 and ride on opposite sides of the angle 20. The principal purpose of the secondary carriage 17 is to provide a support for a motor 24 which drives a cutter disk 25. The motor 24 is supported by a plate 26 which, in turn, is retained in slide ways 27 and 28 attached to the frame 18. In order to position the motor so that the cutter disk 25 is in cutting relationship with the tread slab 6, an air cylinder 29 is provided which is attached to the frame 18 with a piston rod 30 connecting to the plate 26. By this arrangement the cutter disk 25 may be moved into or out of cutting engagement with the tread 6.

Means are provided for moving the secondary carriage 17 transversely of the tread slab 6. This means comprises essentially a threaded rod 31 supported at each end by the side plates 8 and 9. By means of a reversible motor 32 supported by the frame work of the carriage 4 and connected to the threaded rod 31 through pulleys 33 and 34 and a belt 35, the threaded rod 31 is caused to rotate. An internally threaded block 36 has complementary engagement with the threaded rod 31. The block 36 is attached to the frame 18. By this arrangement rotary movement of the rod 31 causes the carriage 17 to move transversely of the tread slab 6. Return movement of the carriage 17 is caused by a reverse rotation of the rod 31 coupled with the reversible motor 32.

The extent of the transverse movement of the carriage 17 is controlled by means of self-acting limit switches 37 and 38 adjustably mounted on a bar 39 supported by the side plates 8 and 9. Projections 40 and 41 (see Figs. 1 and 2) extending from the frame 18 are engageable with the limit switches 37 and 38 respectively for controlling the motor 32. In the operation of the carriage 17, as shown in Figure 1, the cylinder 29 is actuated by means of a control valve 42 having an air valve 42ᵃ and an operating solenoid 42ᵇ which is energized by means hereinafter described. This causes the piston rod 30 to be extended, thus moving the knife disk 25 into cutting position relative to the tread slab 6. The knife 25 is rotating continuously throughout the operation. As the cutter 25 moves into cutting position, a lug 43 projecting from the plate 26 engages an electrical switch 44, which starts operation of the motor 32. This, in turn, causes the carriage 17 to move transversely of the tread slab 6. At the end of the transverse movement of the carriage 17, the projection 40 actuates the limit switch 37 which, in turn, stops the motor 32 and deenergizes the solenoid 42ᵇ causing the piston 30 to recede in the cylinder 29. This operation moves the cutter 25 out of cutting position with the tread slab 6. At the end of the receding stroke of the piston rod 30, the lug 43 engages with a switch 45 which causes the motor 32 to reverse its direction of rotation causing the carriage to return to its original position. Upon reaching the end of the return movement of the carriage 17, the projection 41 engages the limit switch 38 which stops operation of the motor 32. Even though limit switch 38 is operated to stop reverse operation of motor 32 when carriage 17 returns, nevertheless the motor can be again energized to start a cutting cycle through a separate parallel current supply circuit controlled by actuation of switch 44. The interaction between switches 38 and 44 will be more fully explained hereinafter in connection with the wiring diagram of Fig. 10. Thus the tread cutting unit completes a cycle of operation and remains in an inactive state until again energized by means hereinafter described.

In cutting different width treads, the distance of the transverse movement of the carriage 17 should be variable in accordance with the different width treads. Since a cycle of operation includes the return transverse movement of the cutter, it is desirable to limit the transverse movement of the cutter to a distance sufficient only to cut the tread slab. This permits the cutter to return more quickly so as to be ready for another cutting operation, thereby permitting shorter lengths of stock to be cut. To accomplish control of the transverse movement of the carriage 17, I provide a rod 46 having right and left hand threads at opposite ends which engage lugs 47 and 48 having internal threads. The limit switch 37 is attached to the lug 47 and the limit switch 38 is attached to the lug 48. The arrangement is such that rotary movement of the threaded rod 46 will move the limit switches 37 and 38 in opposite directions transversely of the tread slab 6 in slidable relation along the bar 39. The threaded rod 46 is supported by the side plates 8 and 9, and a hand crank 49 attached to the threaded rod 46 permits manual rotation thereof.

Figures 3, 8:
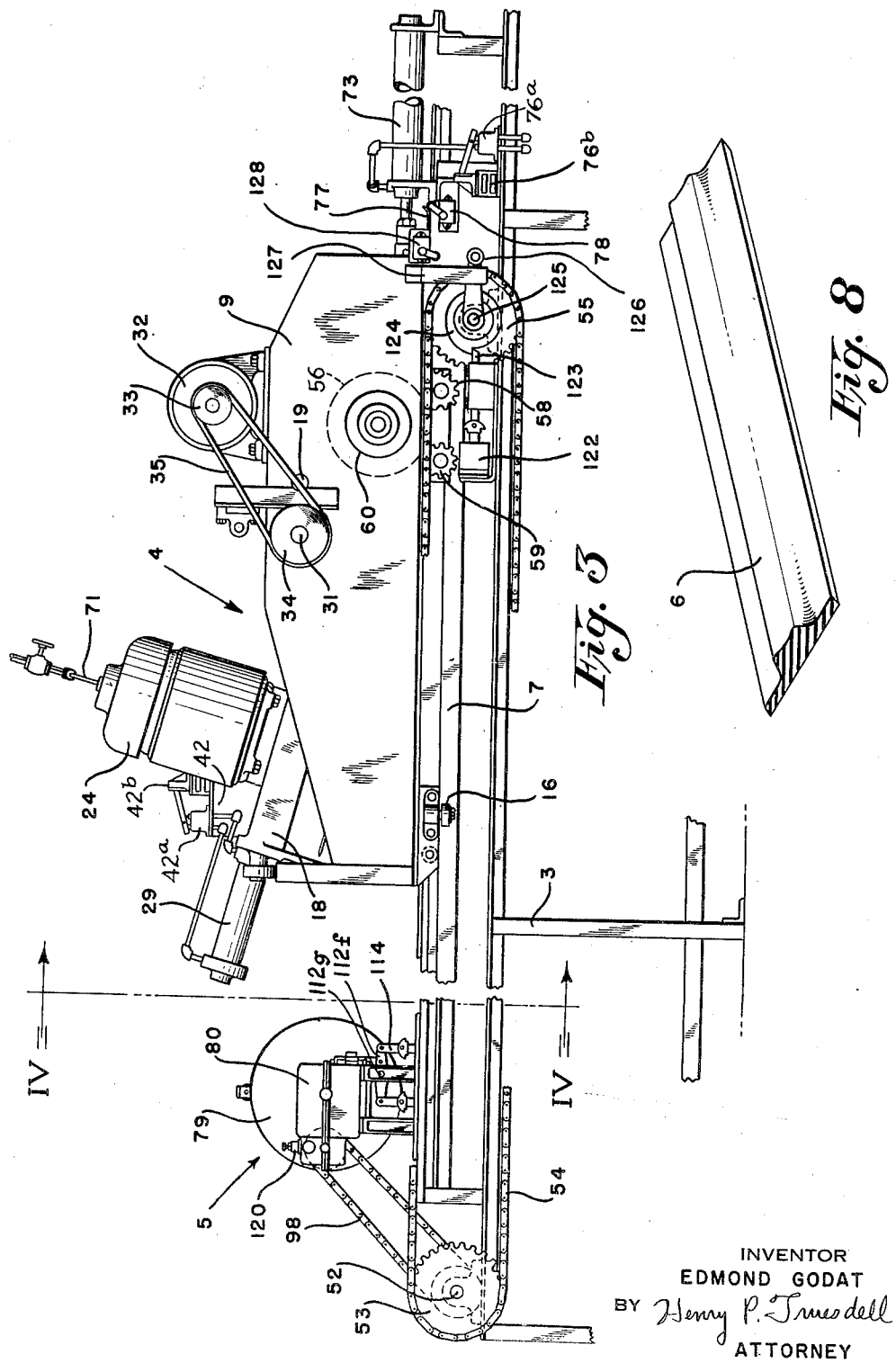
Figure 3 is a side elevational view illustrating the opposite side of the apparatus.
Figure 8 is a perspective view in section of a length of tread slab.

As shown in Figure 1, the conveyor is driven by a sprocket 50 which, in turn, is connected by a chain 51 to a source of power (not shown). A shaft 52 on which the sprocket 50 is keyed also supports sprockets 53 positioned at each end of the shaft for supporting carriage 4 drive chains 54. Sprockets 53 are of substantially the same radius as the roller 2 plus the thickness of the conveyor belt 2 so that the surface speeds of the chains 54 and belt 1 are substantially equal. The chains 54 at their opposite ends are supported by sprockets 55 (Figs. 2 and 3) associated with the frame 3. Meshing with the top side of each chain 54 is a sprocket 56 (Figure 2) keyed to a shaft 57 supported by the side plates 8 and 9. Idler sprockets 58 and 59 rotatably supported by the carriage 4 insure proper meshing engagement of the sprocket 56 with the chain 54. While the sprocket 56 normally rotates as an idler relative to the chain 54, means are provided in the form of a magnetic clutch 60 (Figure 4) for preventing rotation of the shaft 57 and consequently locking the sprockets 56 with the chains 54. As a result of the locking of the sprocket and chain, the entire carriage 4 moves along with the conveyor belt and at the same rate of speed since, as already mentioned, the surface speeds of the belt and chain are equal. The tread 6 is transversely severed during the movement of the carriage 4. The magnetic clutch 60 is energized by means hereinafter described.

In cutting treads for pneumatic tires, it is customary to cut the treads diagonally relative to the thickness of the material so that as the ends of the tread are joined together they will overlap in part for facilitating splicing. Usually this operation of cutting the treads on a diagonal is referred to as skiving. In performing the cutting operation in the present invention, it is desirable to raise the tread from the top of the conveyor belt in order to facilitate cutting. This is accomplished by providing a bar 61 (Figure 2) extending transversely of the conveyor and attached to the carriage 4. A second tread support 62, also attached to the carriage 4, is positioned in spaced relation with the bar 61. The space between the bar 61 and the support 62 provides an opening for clearance of the knife blade 25 while it severs the tread. A roller 63 located adjacent to the bar 61 functions to assist movement of the tread 6 over the bar 61 and facilitates retracting movement of the carriage 4 relative to the tread 6.

As a further means of facilitating the cutting operation, water is used for lubricating the rotating knife blade 25. As shown particularly in Figure 9, a shaft 64, which extends through the motor 24, is provided with a channel 65 communicating at its lower end with radial apertures 66. A flange 67 keyed to the shaft 64 cooperates with a nut flange 68 for retaining the blade 25 in clamping position relative to the shaft 64. Radial grooves 69 and 70 at the face of the flanges 67 and 68 respectively communicate with the radial apertures 66 and thus with the channel 65. A conduit 71 joins with the channel 65 and communicates with a source of water supply. By this arrangement, water which enters the channel 65 passes through the grooves 69 and 70 and is thrown out by centrifugal force along the surface of the knife disk 25 to form a lubricating surface thereon.

While advance movement of the carriage 4 is caused by locking of the carriage 4 with the constantly moving chains 54, means are provided in the form of a pair of air cylinders 72 and 73 for returning the carriage to its original position. The air cylinders 72 and 73 are positioned on each side of the conveyor 1 and are supported by the structural members 3 of the conveyor frame. As the carriage 4 moves along with the conveyor, the cylinders 72 and 73 are open to the atmosphere allowing the piston rods 74 and 75 to become extended in accordance with the movement of the carriage 4. The cylinders 72 and 73 are actuated to return the carriage 4 to its original position after the cutting cycle has been completed. The actual cutting cycle is completed when the cutter disk 25 moves out of engagement with the tread 6, and when the switch 45 (Figure 1) is actuated to reverse the motor 32. Switch 37, previously referred to, also functions to cause the cylinders 72 and 73 to move the carriage 4 back to its original position. The switch 37 operates solenoid 76b (Figures 1 and 3) which in turn operates air valve 76a to admit air under pressure to the air cylinders 72 and 73 to move the carriage 4 back to its original position. When the carriage 4 is returned to its original position, a cam arm 77 attached to the frame of the carriage 4 engages with a limit switch 78 which, in turn, deenergizes solenoid 76b to reverse the action of the air valve 76a for releasing the air in the cylinders 72 and 73. This places the cylinders in condition for repeating a similar cycle of operation.

Means for initiating movement of the carriage 4 and means for determining a length of the tread slab are controlled by a timing or measuring unit 79, as shown in particular in Figures 5, 6, and 7. In general, the measuring unit comprises a housing 80 attached to the structural frame 3, and a control box 81 attached to the housing 80. Included with the control box 81 is a front face or dial 82 with which an indicator arm 83, keyed to a central shaft 84, cooperates. The dial 82 includes calibrations indicative of the length of a tread slab and the pointer arm 83 registers with the calibrations for the purpose of indicating the length of the tread slab. Within the control box 81 and keyed to the shaft 84 is a cam arm 85 which is movable with the pointer 83 for the purpose of actuating electrical means for controlling the initial cutting operation. In cooperation with the cam arm 85 is an electrical switch 86 supported by an arm 87 attached to a sleeve 88 rotatably positioned over the shaft 84. Also attached to the sleeve 88 and in front of the dial face 82 is a control arm 89 which may be manually positioned relative to the dial calibrations and which determines the position of the switch 86 for controlling the length of the tread slab 6. The control arm 89 includes a manually operated clamping nut 90 for securing the control arm 89 in a fixed but adjustable position relative to the dial 82.

In order to provide an electrical path to the rotatable switch 86, a brush and commutator is provided within the control box 81. Essentially this comprises a disk of electrically insulated material 91 attached to the inner face of the dial 82 and having spaced metallic rings 92 and 93 fixed thereto for the purpose of functioning as electrical terminals. In cooperation with the rings 92 and 93 are spring retained brushes 94 and 95 supported by a bracket 96 attached to the arm 87. Conventional wiring (not shown) joins the brushes 94 and 95 with the switch 86.

The measuring unit 79 is driven from the main conveyor by means of a sprocket 97 keyed to the conveyor drive (see Figs. 2 and 6), a chain 98 and a sprocket 99 supported by a shaft 100 mounted in the housing 80. Within the housing 80, the central shaft 84 is driven by means of a train of gears 101 and 102 selectably engageable with gears 103 and 104 respectively. The gears 103 and 104 are keyed to a shaft 105 and also keyed to the same shaft are gears 106 and 107. Gear 106 meshes with a gear 108 rotatably supported by the shaft 84. The gear 107 meshes with an idler reverse gear 109 which, in turn, meshes with a gear 110 rotatably mounted on the shaft 84. A double faced clutch unit 111 slidably keyed to the shaft 84 is cooperable with the faces of the gears 108 and 110 for selectively coupling movement of either of said gears with the shaft 84.

The clutch unit 111 is operated by means which includes an arm 112 freely rotatable on a shaft 112a. A set collar 112b holds the shaft in position. An inner arm 112c is keyed to the shaft 112a and cooperates and moves with the arm 112 through a spring connection 112d, best shown in Fig. 5. The springs provide a lost motion connection between the arms 112 and 112c and permit the arm 112c to be centered with respect to the arm 112. Two arms 112e are likewise keyed to the shaft 112a and pivot back and forth as the shaft rotates to move the clutch mechanism into and out of engagement with the gears 108 and 110. A link 113 connects the end of arm 112 to a lever 112f which is fulcrumed on pin 112g, shown in Fig. 6. Links 114 connect opposite ends of the lever 112f to solenoids 115 and 116 (see Figs. 2 and 5). Since the solenoids are located on opposite sides of the pivot 112g they are operable to move the lever 112f up and down which movement is transmitted to the arm 112 by the link 113. Movement of arm 112, in turn, is transmitted to the arm 112c by means of the spring connection 112d so that arm 112e pivots to move the clutch into engagement with either one of the gears 108 and 110. For example, if the arm 112 moves upwardly, in the showing of Fig. 5, the spring connection 112d will transmit the movement to arm 112c to move arm 112e to the left so that the clutch mechanism engages gear 110, in the showing of Fig. 6. An advantage of the spring connection 112ᵈ is that it returns the arm 112ᶜ and consequently the clutch mechanism to a neutral position when neither one of the solenoids is energized. Energization of either of the solenoids 115 or 116 causes operation of the clutch unit 112 to drive the shaft 84 in a forward or reversed direction for a purpose to be described later.

The purpose of the dual gears 101 and 102 (Fig. 7) is merely to permit a change in ratio of the gears for driving the shaft 84 at variable speeds in order to increase the movement of the pointer 83 for relatively short treads 6. It was found in cutting short length treads that the back lash in the gears created a slight error in the cut length. By positioning the control arm 89 around the dial 82 twice the distance ordinarily necessary, and by increasing the speed correspondingly the degree of error is considerably reduced.

In Figure 6, the gears 101 and 102 are illustrated for the purpose of clarity in a disengaged position although normally they are in engagement with either one of the gears 103 and 104. A manual knob 117 (Figure 7) is axially moved for positioning the gears 101 and 102 into meshing relationship with either of the gears 103 or 104 respectively. The knob 117 is attached to a rod 118 supported by the housing 80. A finger 119, attached to the rod 118, slidably engages with the gears 101 and 102 for determining their position. A spring latch means 120 cooperates with identations in the rod 118 for retaining the gears 101 and 102 in selectably operable positions.

Within the control box 81 and attached in a fixed position to the dial 82 is a secondary switch 121 which in cooperation with the adjustable position switch 86 determines the length of the tread slab. Switch 121 is set at the zero position on the dial. In the operation of the timing mechanism, the control arm 89 is rotated to the desired position relative to the zero calibration on dial 82 for selectably predetermining the length of a tread slab. This movement of the control arm 89 functions to position the switch 86 in proper spaced relationship with the switch 121. When either one of the solenoids 115 or 116 is energized, in a manner to be described later, the cam arm 85 oscillates back and forth to actuate the switches 86 or 121. For example, if the solenoid 115 is energized, the clutch 111 will engage with the gear 108 for driving the shaft 84. The cam arm 85 which is keyed to the shaft 84, in its path of rotation, will move from switch 121 to switch 86 so as to close the circuit therein.

When either switch 121 or 86 is energized, a solenoid 122 (Figure 3) is actuated for releasing a latch 123 to permit rotation of a conventional Hillard single revolution clutch 124. The clutch 124 is mounted on a shaft 125 which supports the continuously rotating sprocket 55. Arms 126 associated with the clutch 124 move with the clutch 124 and engage brackets 127 projecting from opposite sides of the carriage 4. As a result of this engagement, the carriage 4 begins to advance in the direction of the moving conveyor 1. As the arm 126 continues its rotary movement it engages a switch 128 which energizes the magnetic clutch 60 which, in turn, locks the sprocket 56 with the chain 54, thus causing the carriage 4 to thereafter move along with the movement of the chain 54. The clutch 60 is released to permit return of the carriage 4 through actuation of the switch 37 which limits the transverse movement of the secondary carriage 17. The single revolution clutch 124 locks in at zero loading and the arms 126 accelerate the carriage 4 from zero to belt speed in one quarter revolution resulting in the magnetic clutch 60 likewise locking in at zero loading. This operation reduces the possibility of slippage, which would normally occur if the load were applied instantly, and produces greater accuracy in the length of the cut tread slab. The switch 128 which energizes the magnetic clutch 60 simultaneously energizes the solenoid 42ᵇ of the air control valve 42 for initiating the cutting cycle operation as hereinbefore described.

As mentioned in the preceding paragraph, an important advantage of the invention is that both the single revolution clutch 124 and the magnetic clutch 60 drop in at zero load so that it is possible to cut the lengths of tread accurately and quickly irrespective of the speed of the conveyor and irrespective of variations in the size and thickness of the tread to be cut. When the clutch 124 drops in, the arms 126 are in the horizontal position; consequently, there is no load on the clutch. The arms 126 accelerate the carriage 4 from zero to conveyor belt speed in one-quarter of a revolution. It has previously been pointed out that the surface speed of the chains 54 equals the surface speed of the conveyor belt. Inasmuch as the radius of the arm 126 is substantially equal to the radius of the sprocket 55 then at the top vertical position of the arm 126 the carriage will be travelling at the speed of the conveyor belt. Thus the motion of the carriage 4 has been accelerated from zero to full conveyor belt speed in one-quarter of a revolution. The magnetic clutch 60 is energized at this point and locks in at no load since the carriage is moving at belt speed. If either of the two clutches dropped in under partly or fully loaded condition, a variable slippage factor might be introduced which would make the cut lengths of the tread vary considerably.

The general operation of the automatic cutting machine may be summarized briefly as follows: The circuit is energized and the pointer 83 moved to zero position so that cam arm 85 actuates the switch 121. This closes the circuit to solenoid 122 which releases the single revolution clutch 124 so that the arm 126 initiates movement of the carriage 4 in synchronism with movement of the conveyor belt. When the clutch arm 126 reaches a substantially vertical position it actuates the switch 128 to operate solenoid 60. This locks the gears 56 in engagement with the chain 54 so that movement of the carriage is now taken up directly through the medium of these gears and chains. Simultaneously, switch 128 actuates the solenoid 42ᵇ so that the control valve 42ᵃ admits air to the chamber 29. This causes the plunger carrying the rotating cutting disk 25 to move downwardly to a point alongside the tread 6. Arm 43 carried by the plunger now closes the switch 44 which energizes the motor 32 to drive the frame 17 transversely of the carriage 4.

During this time, as the carriage 4 and tread 6 are being moved in synchronism with the conveyor, the rotating cutting knife 25 makes a beveled cut through the tread 6. After completion of the cut the stop 40 on the carriage 17 actuates the switch 37 to stop "forward" operation of the motor 32. Actuation of the switch 37 also deenergizes the solenoid 42ᵇ so that the cutter blade is drawn back by the fluid in cylinder 29 acting on the piston 30; at the same time operation of the switch 37 deenergizes solenoid clutch 60 to release the gears 56 from engagement with the chains 54 and operates solenoid 76b to admit air to the chambers 72 and 73 to return the carriage 4 to its initial position. When the cutter blade is retracted arm 43 actuates switch 45 to initiate "reverse" operation of motor 32. Motor 32 then traverses the frame 17 and cutter blade back to its initial position without making a cut. When the carriage reaches its initial position the arm 77 closes the switch 78 which, in turn, de-energizes the solenoid 76b to release air pressure from the chambers 72 and 73.

During the time necessary for this sequence of operations to take place, the cam arm 85 and pointer 83 are being driven around the dial by means of the gear mechanism in the timer until arm 85 reaches the switch 86 which has been preset along the dial to any chosen position. When switch 86 is operated the sequence of operation is repeated, the cam arm 85 now being driven in a reversed direction by the clutch mechanism until it again reaches the switch 121. Thus the cam arm 85 and pointer 83 oscillate or swing back and forth between the switches 121 and 86; they initiate a cutting operation each time arm 85 engages either the switch 86 or the switch 121. In this way the length of the cut tread is determined by the length of the arc through which the arm 85 travels as it oscillates back and forth between the two switches.

Figure 10:
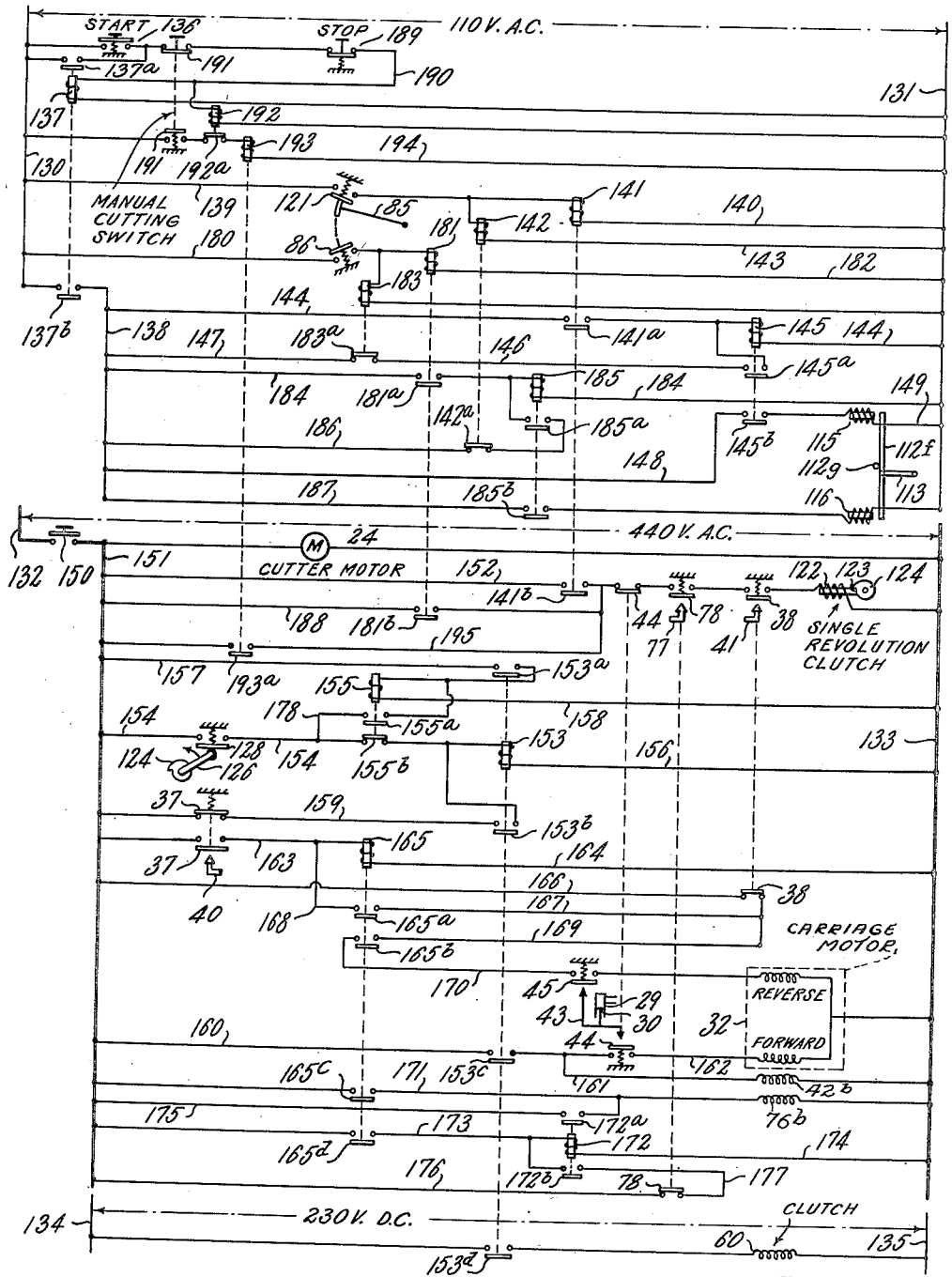
Figure 10 is a schematic view showing part of the cutting device with the associated electrical operating circuit.

Turning now to Fig. 10 of the drawing, the electrical circuit for operating the various switches and parts of the apparatus has been illustrated in an elementary diagram. In the description thus far, only the main operating switches have been identified with a view to explaining the various functions of the cutting machine and the manner in which it operates. However, Fig. 10 illustrates a suitable electrical circuit for controlling the operation of the machine. In Fig. 10, the relays and switches have been shown in their normal or de-energized position.

The upper portion of the wiring diagram of Fig. 10 illustrates what may be termed a control circuit including the timer or measuring mechanism and which is supplied with 110 volt A. C. from power lines 130 and 131. The center portion of the diagram illustrates a power circuit for the motors and which utilizes 440 volt A. C. received from supply lines 132 and 133. At the bottom of the diagram are illustrated 230 volt D. C. power lines 134 and 135 for energizing clutch 60.

Referring to the upper part of Fig. 10, the timer control circuit is energized by momentarily closing the manual "Start" switch 136 which energizes the coil of relay 137 through a normally closed "Manual cutting switch" 191, normally closed "Stop" switch 189 and conductor 190; this picks up the contacts 137a to form a holding circuit around the switch 136 so that the relay 137 is energized during the period of operation of the machine. The other contacts 137b of the relay close the circuit to an auxiliary power supply line 138. The timer control circuit is now energized through line 138 for controlling the operation of the cutting machine upon proper positioning of the pointer 83 and cam arm 85.

It is assumed that the control arm 89 and switch 86 have been preset to a position along the dial 82 in accordance with the length of tread to be cut. When the cam arm 85 is positioned to momentarily close switch 121, it completes a circuit through conductors 139 and 140 to a relay 141; at the same time, a circuit is completed to a relay 142 through a conductor 143. When relay 141 picks up it closes its normally opened contacts 141a to complete a circuit through conductors 144 to a holding relay 145. In turn, relay 145 picks up its contacts 145a to form a holding circuit for the relay coil through conductor 146, normally closed contacts 183a and conductor 147. The purpose of this holding circuit is to keep relay 145 energized when contacts 141a drop out upon de-energization of relay 141 when switch 121 returns to open position. Energization of relay 145 likewise closes contacts 145b to complete a circuit through conductors 148 and 149 to the solenoid 115. As already mentioned, when solenoid 115 is energized it operates the clutch mechanism in the timer 5 through the arm 112f and link 114 to cause the cam arm 85 and pointer 83 to leave the zero position, in engagement with switch 121, and travel around the dial to a position such that they engage switch 86. During this interval of travel, the tread cutting operation is completed and the mechanism reset in a manner now to be described.

In the power circuit a switch 150 is closed to energize an auxiliary supply circuit 151 and the cutter motor 24. This motor operates continuously during operation of the cutting machine. When relay 141 in the timer control circuit is momentarily energized by closing of switch 121, its contacts 141b located in the power supply circuit are closed to energize the solenoid 122 of the single revolution clutch 124; current flows from supply line 151 through a conductor 152, closed contacts 141b, the normally closed contacts of switch 44 on the cutter frame, the contacts of switch 78 which have been closed by the carriage 4 in its initial position, the contacts of switch 38 which have been closed by the lug 41 on frame 17 when the frame is in its initial position, and thence through the solenoid 122 to the other supply line 133. The solenoid 122 then retracts the latching pin 123 to start operation of the single revolution clutch 124. As formerly stated, the clutch acts to start the carriage 4 on its movement with the conveyor before the clutch 60 locks in. Since the contacts 141b are closed momentarily the pin 123 is withdrawn momentarily and is then released to stop operation of the clutch after a single revolution. As the arm 126 rotates to start movement of the carriage 4 it reaches a vertical position where it closes the switch 128 carried by the carriage.

When switch 128 is momentarily closed it energizes a holding relay 153 through a conductor 154, normally closed contacts 155b, and conductor 156. When relay 153 picks up it closes contacts 153a to complete a circuit to relay 155 through conductors 157 and 158. Energization of relay 155 opens the contacts 155b to interrupt the circuit to relay 153; at the same time, it closes contacts 155a to form a holding circuit which is formed under circumstances to be described later. Although contacts 155b and the switch 128 are opened immediately after relay 153 picks up, the relay is not de-energized due to the fact that its contacts 153b close to form a holding circuit through conductor 159 and the normally closed contacts of switch 37.

When relay 153 is energized contacts 153c and 153d are closed. Closure of contacts 153d completes the circuit from the D. C. power supply lines 134 and 135 to the clutch solenoid 60 which locks the carriage 4 to the chains 54. This means that the carriage is moved along in synchronism with the conveyor 1 and the tire tread 6. Closure of contacts 153c completes a circuit from conductor 160 to conductor 161 and thence to the solenoid coil 42b which controls operation of the piston rod 30 in cylinder 29. At this time the slide 26 and cutting blade 25 are moved into cutting position alongside the tread. When the cutting blade 25 moves down into cutting position the lug 43 operates switch 44 to complete a circuit from conductor 160 to conductor 162 and thence to the "Forward" control coil on motor 32. Motor 32 operates to move frame 17 transversely of the conveyor to cut a length of the tread. It should be noted that the switch 44 is provided with an additional set of contacts in the circuit to the clutch solenoid 122. These are opened during the cutting operation positively to prevent recycling of the clutch.

When the frame 17 reaches its limit of travel after cutting the tread the lug 40 engages the switch 37 to open the normally closed contacts in the conducting line 159. This breaks the holding circuit to relay 153 so that contacts 153b, 153c and 153d are opened. Opening of contacts 153d releases the clutch 60 locking the carriage to the drive chains 54; opening of contacts 153c breaks the circuit to the "Forward" control coil of motor 32 thereby stopping operation of the motor driving frame 17. At the same time the circuit to solenoid 42b is interrupted which permits the piston rod in cylinder 29 to return to normal position thereby withdrawing the cutting blade from alongside the thread.

Upon operation of switch 37 its normally open contacts close to complete a circuit through conductors 163 and 164 to a holding relay 165. Since the contacts of switch 37 are only momentarily held closed by the lug 40 a holding circuit is provided around these contacts. This holding circuit includes conductor 166, the closed contacts of switch 38, conductor 167, the closed contacts 165a which have been picked up by the relay 165, and the conductor 168. The contacts of switch 38 are closed due to the fact that the lug 41 carried by the frame 17 has moved away from the switch 38 upon the beginning of the cutting stroke thereby permitting it to return to normal position. When the cutter 25 and plate 26 return to normal position the lug 43 closes the switch 45 to complete a circuit to the "Reverse" control coil of motor 32; this drives the motor in a reverse direction so that the frame 17 is moved transversely back across the carriage 4. The circuit to the control coil is completed from power line 151 to conductor 166, the closed contacts of switch 38, a conductor 169, closed contacts 165b of relay 165, conductor 170, the closed contacts of switch 45, and thence through the "Reverse" control coil to the other power supply line 133.

In order to return the carriage 4 to initial position the contacts 165c, which are closed by energization of relay 165, complete a circuit through conductor 171 to the solenoid 76b which operates air valve 76a to admit air to the cylinder 72 and 73 causing the pistons 74 and 75 to return the carriage. To keep the carriage return solenoid 76 energized irrespective of the position of the transversely moving frame 17 the contacts 165d of relay 165 have previously been closed to energize a holding coil 172 through conductors 173 and 174. When relay 172 picks up it closes contacts 172a to form a holding circuit around contacts 165c through conductors 175 and 171. The relay 172 itself is provided with a holding circuit around the contacts 165d. This circuit includes conductor 176, the normally closed contacts of switch 78, conductor 177 and the picked-up contacts 172b. Thus solenoid 76 will continue to be energized irrespective of whether or not contacts 165c and 165d drop out by de-energization of relay 165.

In the operation thus far described, the cutting machine has completed that portion of its cycle of operation in which the tread is cut, the frame 17 is being returned transversely of the carriage to its initial position by reverse operation of the motor 32, and the carriage 4 is being returned to initial position by the action of the air cylinders 72 and 73. Thus, in effect, a race is taking place between the frame 17 and the carriage 4 to see which one will return to its initial position first. The winner of the race will depend upon certain variable factors such as the air pressure applied to the cylinders, the speed of the motor 32, and the adjustment and lubrication of the various moving parts. However, the electrical circuit is so arranged that it will be reset for another cutting operation irrespective of whether the frame 17 or carriage 4 returns to initial position first.

If it is assumed that the frame 17 reaches its starting position first, then the lug 41 will close switch contacts 38 in the circuit to clutch solenoid 122 and it will open the normally closed contacts of switch 38 between conductors 166 and 167 in the holding circuit for relay 165. As the relay is de-energized contacts 165b open to interrupt the circuit through conductors 169 and 170 to the "Reverse" control coil of motor 32. This stops drive motor 32 thereby halting transverse movement of the frame 17 in position for the next cutting operation. Even though relay 165 drops out to open the contacts 165c and 165d the circuit to the solenoid 76b controlling the air pressure to cylinders 72 and 73 is not interrupted due to the fact that the holding relay 172 remains energized to maintain the circuit to solenoid 76b through conductors 175 and 171. As soon as the carriage 4 reaches its initial position it operates the switch 78 to close its contacts in the circuit to clutch solenoid 122 and open the circuit between conductors 176 and 177 thereby interrupting the holding circuit to relay 172. This causes the relay to drop out to open contacts 172a and de-energizes the solenoid 76b. By this time the carriage will have returned to initial position so that the air pressure can be cut off by de-energization of solenoid 76b. When the cutting blade was withdrawn from cutting position the lug 43 released the switch 44 which returned the contacts thereof to normally closed position in the circuit to the solenoid clutch 122. Thus all the relays in the circuit to solenoid 122 have been properly positioned for another cycle of operation of the single revolution clutch.

If, however, the situation is such that the carriage 4 returns to its initial position before the transversely moving frame 17 then the circuit operates in a somewhat different manner. When the carriage reaches its initial position it operates switch 78 to open the circuit to the holding coil 172; this opens the contacts 172a in the holding circuit around contacts 165c. Relay 165 remains energized so that motor 32 continues to operate in a reverse direction until frame 17 returns to initial position at which point lug 41 opens the normally closed contacts of switch 38. This interrupts the circuit to the "Reverse" control coil of motor 32. Since at the same time relay 165 drops out the contacts 165c open the circuit to the air pressure solenoid 76. It will thus be apparent that the power circuit is reset for another cutting operation irrespective of whether the cutter frame 17 or carriage 4 first return to initial position.

In the event that the conveyor stops at the exact point where the arm 126 maintains the switch 128 in closed position means is provided to permit the cutting blade to complete the cutting operation but which prevents the cutter from re-cycling in the event that switch 128 remains closed. This is the purpose of relay 155. In the normal situation, as when switch 128 is open at the completion of a cutting operation, lug 40 operates switch 37 to open the holding circuit through conductor 159 to relay 153 so that contacts 153c open to stop operation of motor 32. When relay 153 drops out it also opens contacts 153a which had completed a circuit to relay 155. When relay 155 was energized it closed contacts 155a and opened contacts 155b; thus if switch 128 is held closed a holding circuit for relay 155 is formed from line 151 through conductor 154, switch 128, a conductor 178 and contacts 155a to the coil of the relay and thence by conductor 158 to the other power supply line. As long as relay 155 is energized contacts 155b are opened so that relay 153 cannot be re-energized, once it is de-energized by operation of switch 37, to again initiate a cutting cycle. In this way the machine cannot begin another cutting operation as long as switch 128 is held closed.

During the completion of the cutting cycle, the timer has been driven through the clutch mechanism 111 to move the pointer 83 and cam arm 85 around the dial 82, the distance of travel depending upon the setting of switch 86 which corresponds with the length of tread to be cut. When cam arm 85 engages switch 86 it initiates another cutting cycle of the machine. To this end, momentary closure of switch 86 completes a circuit from power supply line 130 through a conductor 180, the closed contacts of switch 86, relay coil 181, and conductor 182 to the other supply line 131. At the same time, a circuit is completed to relay 183 for a purpose to be presently described. Contacts 181a of relay 181 are closed to complete a circuit through conductor 184 to a holding relay 185. When relay 185 picks up, it closes contacts 185a to form a holding circuit through conductor 186 and normally closed contacts 142a so that when contacts 181a open as relay 181 drops out, upon opening of switch 86, the circuit to relay 185 will be maintained. When relay 185 operates to close contacts 185b a circuit is completed through conductor 187 to the other solenoid 116 to shift the clutch mechanism through linkage 114 to reverse the direction of rotation of the pointer 83 and cam arm 85. At the time that solenoid 116 is energized the opposing solenoid 115 is de-energized due to the fact that relay 145 drops out opening the circuit through contacts 145b; relay 145 is de-energized by operation of relay 183 since the circuit through conductors 147 and 146 is interrupted by opening of contacts 183a. Thus, when switch 86 is actuated the direction of rotation of the cam arm 85 is reversed by energization of solenoid 116 and de-energization of solenoid 115. In a similar way when switch 121 is closed to energize relay 142 the normally closed contacts 142a open to interrupt the holding circuit through contacts 185a which holds in the relay 185 permitting it to drop out so that contacts 185b open to de-energize solenoid 116. This permits solenoid 115 to be energized in the manner already described.

When switch 86 is closed, a cutting cycle is initiated by closure of contacts 181b in the power circuit and which complete a circuit through conductor 188 to the solenoid 122 of the single revolution clutch. The clutch operates to initiate the cutting cycle heretofore described.

If it is desired to stop operation of the machine, a "Stop" switch 189 is operated to break the holding circuit through conductor 190 to relay 137; this permits contacts 137b to open so that the auxiliary power supply line 138 no longer energizes the solenoids 115, 116 and associated relays. This stops operation of the timer by permitting the clutch mechanism to return to neutral position under the influence of the spring lost motion connection 112d.

In certain instances, as when heavy truck tire treads are to be cut at random lengths, it is desirable to operate the cutting machine without utilizing the automatic timer. In such situations, a "Manual cutting switch" 191 is provided in the control circuit for initiating a cutting operation. When switch 191 is depressed it closes a circuit through the closed contacts 192a of relay 192 to energize relay 193 through a conductor 194. This closes contacts 193a in the power circuit to complete a circuit through conductor 195 to the solenoid 122 of the single revolution clutch. This initiates a cutting cycle in the manner already described. When the "Manual cutting switch" 191 is used, the holding circuit to relay 137 is interrupted by opening of the normally closed contact of switch 191 so that it is impossible to energize the timer at this time. Similarly, when the automatic timer is being used current will flow from the holding circuit of conductor 190 through relay 192 to pick up the relay so that contacts 192a are opened thereby preventing energization of relay 193. This means that it is impossible to interrupt the cycle of operations by closing the "Manual cutting switch" 191.

The cutting machine is one which operates quickly and easily to sever lengths of tire tread as the tread moves along in a continuous sheet with the conveyor 1. The length of movement of the cutting blade may be varied at will to accommodate treads of different widths. Also, the control arm 89 may be set to any chosen position on dial 82 and thus automatically determine the length of tread to be cut. Inasmuch as the carriage clutch 60 and the single revolution clutch 124 both lock in at zero load there is no slippage in the clutch mechanisms so that it is possible to cut the tread length accurately.

Another advantage of my invention is the fact that the distance the carriage 4 moves along with the conveyor belt, i. e., the time during which the carriage is locked to the chains 54 will vary in accordance with the width of the tire tread being cut; also the distance and time will vary in accordance with the speed at which the cut is made. This means that if a wide heavy tread is being cut that it will take the cutting blade an additional length of time to sever the tread. Nevertheless, the carriage 4 will move along in synchronism with the conveyor 1 for this greater length of time. This interlocking control is obtained by utilizing the contacts 165c to operate the air pressure solenoid 76 to control the carriage return, the contacts, in turn, being actuated when the cutting frame 17 completes a cutting operation in a position such that the lug 49 closes the switch 37. As already mentioned, the limit switches 37 and 38 are positioned in accordance with the width of the tread being cut.

Also, it will be apparent that the operation of the cutting machine is automatically adjusted in accordance with any variation in the speed of travel of the conveyor belt 1, the speed of the conveyor being determined by the rate at which the tread stock is extruded. This is true because the carriage 4 travels at the same speed as the conveyor belt 1 so that the cutting operation of blade 25 is completed irrespective of the conveyor speed. Since the timer is driven by gearing from the conveyor it too operates directly in accordance with the speed of the conveyor. No adjustment of the timer is required to compensate for variations in conveyor speed.

Having thus described my invention, what I claim and desire to protect by Letters Patent is:

1. An apparatus for cutting strip material comprising a cutter, a conveyor for supporting and moving strip material, a carriage moveable with the conveyor, a second carriage moveable transversely of the first named carriage, a third carriage moveable longitudinally of the second named carriage, means for supporting the cutter in an inclined position on the third named carriage, means for advancing the cutter into cutting position with the strip material, and means for moving the second named carriage transversely of the conveyor, whereby the strip material is severed with tapered edges.

2. An apparatus for cutting strip material comprising a cutter, a conveyor for supporting the moving strip material, a carriage moveable with the conveyor, a second carriage moveable transversely of the first named carriage, a third carriage moveable longitudinally of the second named carriage, means for supporting the cutter in an inclined position on the third named carriage, means for advancing the cutter into cutting position with the strip material, means for moving the second named carriage transversely of the conveyor, whereby the strip material is severed with tapered edges, means for retracting the cutter from cutting position with the strip material, and means for returning the second named carriage to its original position transversely of the conveyor.

3. An apparatus for cutting strip material comprising a cutter, a conveyor for supporting and moving strip material, a chain moveable with the conveyor, a carriage, means for locking the carriage with the chain for movement with the conveyor, a second carriage moveable transversely of the first named carriage, a third carriage moveable longitudinally of the second named carriage, means for supporting the cutter in position on the third named carriage, means for advancing the cutter into cutting position with the strip material, and means for moving the second named carriage transversely of the conveyor, whereby the strip material is severed.

4. An apparatus for cutting strip material comprising a cutter, a conveyor for supporting and moving strip material, a carriage, means for gradually initiating movement of the carriage with the conveyor, a chain moveable with the conveyor, means for locking the carriage with the chain for moving the carriage with the conveyor, a second carriage moveable transversely of the first named carriage, a third carriage moveable longitudinally of the second named carriage, means for supporting the cutter on the third named carriage, means for advancing the cutter into cutting position with the strip material, and means for moving the second named carriage transversely of the conveyor, whereby the strip material is severed.

5. An apparatus for cutting strip material comprising a cutter, a conveyor for supporting and moving strip material, a carriage moveable with the conveyor, a second carriage moveable transversely of the first named carriage, a third carriage moveable longitudinally of the second named carriage, means for supporting the cutter in an inclined position on the third named carriage, means for advancing the cutter into cutting position with the strip material, means for moving the second named carriage transversely of the conveyor, whereby the strip material is severed with tapered edges, measuring means for determining the distance between successive cuts, said measuring means comprising a fixed electrical switch and an adjustable electrical switch, a member driven from the conveyor and adaptable for engagement with said switches, and means operable by actuating of one of said switches for initiating movement of said first named carriage.

6. An apparatus for cutting strip material comprising a cutter, a conveyor for supporting and moving strip material, a carriage moveable with the conveyor, a second carriage moveable transversely of the first named carriage, a third carriage moveable longitudinally of the second named carriage, means for supporting the cutter on the third named carriage, means for advancing the cutter into cutting position with the strip material, means for moving the second named carriage transversely of the conveyor, whereby the strip material is severed, and means located in the path of the second named carriage for limiting the extent of transverse movement of the second named carriage.

7. An apparatus for cutting strip material comprising a cutter, a conveyor for supporting and moving strip material, a carriage moveable with the conveyor, a second carriage moveable transversely of the first named carriage, a third carriage moveable longitudinally of the second named carriage, means for supporting the cutter on the third named carriage, means for advancing the cutter into cutting position with the strip material, means for moving the second named carriage transversely of the conveyor, whereby the strip material is severed, and means operated by movement of the second named carriage for causing retraction of the cutter from its cutting position with the strip material.

8. An apparatus for cutting strip material comprising a cutter, a conveyor for supporting and moving strip material, a carriage moveable with the conveyor, a second carriage moveable transversely of the first named carriage, a third carriage moveable longitudinally of the second named carriage, means for supporting the cutter in an inclined position on the third named carriage, means for advancing the cutter into cutting position with the strip material, means for moving the second named carriage transversely of the conveyor, whereby the strip material is severed with tapered edges, and means located in the path of the second named carriage for limiting the extent of transverse movement of the second named carriage and for initiating reverse movement of the second named carriage to its original starting position.

9. An apparatus for cutting strip material comprising a cutter, a conveyor for supporting and moving strip material, a chain moveable with the conveyor, a carriage, means for locking the carriage with the chain for moving the carriage with the conveyor, a second carriage moveable transversely of the first named carriage, a third carriage moveable longitudinally of the second named carriage, means for supporting the cutter in an inclined position on the third named carriage, means for advancing the cutter into cutting position with the strip material, means for moving the second named carriage transversely of the conveyor, whereby the strip material is severed with tapered edges, and means operated by movement of the second named carriage for limiting the extent of transverse movement of the second named carriage and for releasing the locking means between the chain and the first named carriage.

10. Apparatus for cutting strip material traveling with a conveyor comprising, in combination, a moveable carriage, a cutting mechanism moveable transversely on said carriage, means for moving said cutting mechanism transversely of the conveyor to cut the material, means to connect the carriage to the conveyor for movement therewith during operation of the cutting mechanism and to disconnect the carriage after the cutting operation, and means for withdrawing the cutting mechanism from the material and returning it across the material to initial position without cutting the material.

11. Apparatus for cutting strip material traveling with a conveyor comprising, in combination, a carriage adapted to be moved from initial position with the conveyor, a cutting mechanism transversely on said carriage, means for moving said cutting mechanism from initial position on one side of the material transversely of the material to the other side to effect a cutting stroke, means to move the carriage at conveyor speed during operation of the cutting mechanism, means to move said cutting mechanism away from cutting position with respect to the strip material, and means to return the carriage and cutting mechanism to initial positions upon completion of the cutting stroke to position them for the next succeeding cutting cycle.

12. Apparatus for cutting predetermined lengths of strip material traveling with a conveyor comprising, in combination, a device settable in accordance with the length of the material to be cut, a carriage moveable with and adapted to be driven by the conveyor, a cutting mechanism on said carriage moveable across the material, means controlled by said device for moving said cutting mechanism transversely of the material to effect a cut therethrough, means to connect the carriage to the conveyor for movement therewith during operation of the cutting mechanism and means to release the carriage from the conveyor upon completion of the cutting stroke.

13. Apparatus for cutting predetermined lengths of strip material traveling with a conveyor comprising, in combination, a carriage moveable and driven by the conveyor, a cutting mechanism on said carriage moveable across the material, control means for moving said cutting mechanism transversely of the material to effect a cut therethrough and for simultaneously connecting the carriage to the conveyor for movement therewith during the cutting operation, and means operable in accordance with the speed of the conveyor to effect operation of said control means for cutting a strip of material.

14. Apparatus for cutting lengths of a moving strip of material comprising, in combination, a movable supporting carriage, a cutting mechanism moveable transversely on said carriage, means for moving said cutting mechanism from one side of the material transversely thereof to the other side to effect a cutting stroke, means to move the carriage parallel to and at the speed of movement of the material during movement of the cutting mechanism, means to move said cutting mechanism out of cutting position with respect to the strip material, means to return said cutting mechanism to said one side of the strip material without cutting therethrough, and means to return the carriage to initial position upon completion of the cutting stroke.

15. Apparatus for cutting predetermined lengths from continuously moving strip material comprising, in combination, a device settable in accordance with the length of the material to be cut, a movable supporting carriage, a cutting mechanism moveable on said carriage, means controlled by said device for moving said cutting mechanism from one side of the material transversely thereof to the other side to effect a cut therethrough, means to move the carriage at the speed of the strip material during operation of the cutting mechanism, means to move said cutting mechanism out of cutting position with respect to the strip material, means to return said cutting mechanism to said one side of the strip material without cutting therethrough, and means to return the carriage to initial position upon completion of the cutting stroke.

16. Apparatus for cutting predetermined lengths of strip material traveling with a moving conveyor comprising, in combination, a carriage adapted to be moved with the conveyor, a cutting mechanism on said carriage moveable across the material, means for moving said cutting mechanism transversely of the material to effect a cut therethrough and for simultaneously connecting the carriage to the conveyor for movement therewith during the cutting operation, a timing mechanism including spaced switches for controlling said means, the spacing of the switches being adjustable in accordance with the length of material to be cut, and means moveable in accordance with the speed of the conveyor for operating said switches.

17. Apparatus for cutting predetermined lengths of strip material traveling with a moveable conveyor comprising, in combination, a carriage adapted to be moved with the conveyor, a cutting mechanism moveable on said carriage, means for moving said cutting mechanism transversely of the material to effect a cutting stroke, means to move the carriage at conveyor speed during operation of the cutting mechanism, a timing mechanism including spaced switches for controlling both of said means, the spacing of said switches being adjustable in accordance with the length of material to be cut, means moveable in accordance with the speed of the conveyor for operating said switches, and means to return the carriage to initial position upon completion of the cutting stroke.

18. In apparatus for cutting predetermined lengths of strip material traveling with a conveyor, a timing or measuring mechanism including a plurality of electric switches spaced apart a distance depending upon the length of material to be cut, a switch operating member moveable back and forth between said switches, a clutch mechanism for moving said member in either direction and means for driving such clutch mechanism in accordance with the speed of the conveyor, a carriage adapted to be moved with the conveyor, a cutting mechanism moveable on said carriage, and means controlled by said switches for moving said cutting mechanism transversely of the strip material to sever a length thereof.

19. In apparatus for cutting predetermined lengths of strip material traveling with a conveyor, a timing or measuring mechanism including a plurality of electric switches spaced apart a distance depending upon the length of the material to be cut, a switch operating member moveable back and forth between said switches to operate the same, means operable in accordance with the speed of the conveyor to move said member back and forth to operate said switches, a carriage adapted to be moved with the conveyor, a cutting mechanism moveable on said carriage, means to move the carriage at conveyor speed during operation of the cutting mechanism and means controlled by said switches for moving said cutting mechanism transversely of the material to sever a length thereof.

20. In apparatus for cutting predetermined lengths of strip material traveling with a conveyor, a timing or measuring mechanism including a plurality of electric switches spaced apart a distance depending upon the length of material to be cut, a switch operating member moveable back and forth between said switches, a clutch mechanism for moving said member in either direction, and means for driving said clutch mechanism in accordance with the speed of the conveyor, a carriage adapted to be moved with the conveyor, a cutting mechanism moveable on said carriage, means controlled by said switches for moving said cutting mechanism transversely of the material to effect a cut therethrough and means controlled by said switches for operating said clutch mechanism to reverse the direction of movement of said switch operating member.

21. In apparatus for cutting predetermined lengths of strip material traveling with a conveyor, a timing or measuring mechanism including a plurality of switches spaced apart a distance depending upon the length of material to be cut, a switch operating member moveable back and forth between said switches, a clutch mechanism for moving said member in either direction, and means for driving said clutch mechanism in accordance with the speed of the conveyor, a carriage adapted to be moved with the conveyor, a cutting mechanism moveable on said carriage, means controlled by one of said switches for moving said cutting mechanism transversely of the material to effect a cut therethrough and for simultaneously moving the carriage at the speed of the conveyor during the cutting operation, means to return the carriage to initial position upon completion of the cutting stroke and means controlled by the other of said switches for operating said clutch mechanism to reverse the direction of movement of said operating member.

22. In apparatus for cutting predetermined lengths of strip material traveling with a conveyor, a plurality of switches adjustable in accordance with the length of material to be cut, a reversible mechanism for operating said switches in sequence and being operable in accordance with the speed of the conveyor, a carriage adapted to be moved with the conveyor, a cutting mechanism moveable on said carriage, means controlled by one of said switches for moving said cutting mechanism transversely of the material to effect a cut therethrough and simultaneously to move the carriage at the speed of the conveyor during the cutting operation, means to return the carriage to initial position upon completion of the cutting stroke and means controlled by the other of said switches to operate said reversible mechanism.

23. In apparatus for cutting predetermined lengths of strip material travelling with a conveyor, a plurality of switches adjustable in accordance with the length of material to be cut, a reversible mechanism including an arm for operating said switches in sequence, means for operating said mechanism in accordance with the speed of the conveyor, a carriage adapted to be moved with the conveyor, a cutting mechanism moveable on said carriage, means responsive to operation of one of said switches by movement of said arm in one direction to connect the carriage to the conveyor for movement therewith, means controlled by said one switch for moving said cutting mechanism transversely of the material to effect a cut therethrough, means to return the carriage to initial position upon completion of the cutting stroke and means controlled by the other of said switches to reverse the direction of movement of said arm.

24. In apparatus for cutting predetermined lengths of strip material traveling with a conveyor, a plurality of electric switches spaced apart a distance depending upon the length of material to be cut, a pivoted arm for operating said switches, a reversible clutch mechanism for moving said arm in either direction to engage one or the other of said switches, means for driving said clutch mechanism in accordance with the speed of the conveyor, a carriage adapted to be moved with the conveyor, a cutting mechanism moveable on said carriage, and means controlled by one or the other of said switches for moving said cutting mechanism transversely of the material to sever a length thereof.

25. In apparatus for cutting strip material traveling with a conveyor, a carriage adapted to be moved with the conveyor, a cutting mechanism moveable on said carriage, means to accelerate movement of said carriage from a position of rest to full conveyor speed, a clutch mechanism to connect the carriage to the conveyor for movement therewith, means controlled by said first mentioned means to actuate said clutch mechanism after the carriage has reached full speed and means for moving said cutting mechanism transversely of the material to sever a length thereof.

26. In apparatus for cutting strip material traveling with a conveyor, a carriage adapted to be moved with the conveyor, a cutting mechanism moveable on said carriage, a clutch mechanism moveable at conveyor speed and having a portion for engaging said carriage, means for operating said clutch mechanism whereby said portion engages said carriage to accelerate it from a position of rest to full conveyor speed a second clutch mechanism adapted to connect the carriage to the conveyor for movement therewith, means responsive to operation of said first mentioned clutch mechanism to actuate said second clutch mechanism after the carriage has reached full speed, and means for moving said cutting mechanism transversely of the material to sever a length thereof.

27. In apparatus for cutting strip material traveling with a conveyor, a carriage adapted to be moved with the conveyor, a cutting mechanism moveable on said carriage, a clutch mechanism moveable at conveyor speed and having a rotating arm for engaging said carriage, means for operating said clutch mechanism whereby said arm engages said carriage to accelerate it from a position of rest to full conveyor speed, a second clutch mechanism to connect the carriage to the conveyor for movement therewith, means responsive to movement of said arm to actuate said second clutch mechanism after the carriage has reached full speed, and means for moving said cutting mechanism transversely of the material to sever a length thereof.

EDMOND GODAT.

REFERENCES CITED

The following references are of record in the file of this patent:

UNITED STATES PATENTS

| Number | Name | Date |
|---|---|---|
| 1,987,409 | Moore | Jan. 8, 1935 |
| 2,086,374 | Wikle | July 6, 1937 |
| 2,273,533 | Mather | Feb. 17, 1942 |